us009437871B2

United States Patent
Zhou et al.

(10) Patent No.: US 9,437,871 B2
(45) Date of Patent: Sep. 6, 2016

(54) SULFUR BASED ACTIVE MATERIAL FOR A POSITIVE ELECTRODE

(71) Applicant: GM GLOBAL TECHNOLOGY OPERATIONS LLC, Detroit, MI (US)

(72) Inventors: Weidong Zhou, Warren, MI (US); Xingcheng Xiao, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 14/173,512

(22) Filed: Feb. 5, 2014

(65) Prior Publication Data

US 2015/0221935 A1    Aug. 6, 2015

(51) Int. Cl.

| | | |
|---|---|---|
| *H01M 4/76* | (2006.01) | |
| *H01M 4/36* | (2006.01) | |
| *H01M 4/58* | (2010.01) | |
| *H01M 4/02* | (2006.01) | |
| *H01M 4/04* | (2006.01) | |
| *H01M 4/1397* | (2010.01) | |
| *H01M 4/62* | (2006.01) | |
| *H01M 10/0525* | (2010.01) | |

(52) U.S. Cl.
CPC ............. *H01M 4/366* (2013.01); *H01M 4/581* (2013.01); *H01M 4/76* (2013.01); *H01M 4/0471* (2013.01); *H01M 4/1397* (2013.01); *H01M 4/625* (2013.01); *H01M 10/0525* (2013.01); *H01M 2004/021* (2013.01); *H01M 2004/027* (2013.01)

(58) Field of Classification Search
CPC ....... H01M 4/366; H01M 4/581; H01M 4/76
USPC .......................................... 429/213; 427/221
See application file for complete search history.

(56) References Cited

U.S. PATENT DOCUMENTS

2014/0287301 A1* 9/2014 Yushin .................. H01M 4/366
429/188

FOREIGN PATENT DOCUMENTS

WO    WO2012/064702    5/2012

* cited by examiner

*Primary Examiner* — Edward Cain
(74) *Attorney, Agent, or Firm* — Dierker & Kavanaugh, P.C.

(57) ABSTRACT

A sulfur based active material has a core-shell structure including a hollow core and a porous carbon shell surrounding the hollow core. Sulfur is present in a portion of the hollow core. A polymer shell coating is formed on the porous carbon shell. The polymer shell coating includes nitrogen atoms that bond to carbon atoms of the porous carbon shell so that the porous carbon shell is a nitrogen-confused porous carbon shell.

19 Claims, 7 Drawing Sheets

SULFUR BASED ACTIVE MATERIAL FOR A POSITIVE ELECTRODE

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A sulfur based active material has a core-shell structure including a hollow core and a porous carbon shell surrounding the hollow core. Sulfur is present in a portion of the hollow core. A polymer shell coating is formed on the porous carbon shell. The polymer shell coating includes nitrogen atoms that bond to carbon atoms of the porous carbon shell so that the porous carbon shell is a nitrogen-confused porous carbon shell.

A positive electrode, a lithium-sulfur battery, and a method for making the sulfur based active material are also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-sulfur batteries generally operate by reversibly passing lithium ions between a lithium-based negative electrode (sometimes called an anode) and a sulfur-based positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes.

It has been found that the lithium-sulfur battery life cycle may be limited by the relatively poor conductivity of sulfur, and by the migration, diffusion, or shuttling of polysulfides from the sulfur-based cathode during the battery discharge process, through the porous polymer separator, to the lithium-based anode. The $S_X$ polysulfides generated at the sulfur-based cathode are soluble in the electrolyte, and can migrate to the lithium-based anode where they react with the anode in a parasitic fashion to generate lower-order polysulfides. These polysulfides diffuse back to the cathode and regenerate the higher forms of polysulfide. As a result, a shuttle effect takes place. This effect leads to decreased sulfur utilization, self-discharge, poor cycleability, and reduced Coulombic efficiency of the battery. It is believed that even a small amount of polysulfide at the anode can lead to parasitic loss of active lithium at the anode, which prevents reversible electrode operation and reduces the useful life of the lithium-sulfur battery.

It has also been found that sulfur-based cathodes undergo large electromechanical (volume) expansion and contraction during charging/discharging of the lithium-sulfur battery. The large volume change (e.g., about 180%) experienced by the sulfur-based cathodes during charging/discharging causes the sulfur particles to fracture, decrepitate, or otherwise mechanically degrade, which results in a loss of electrical contact and poor life cycling.

The sulfur based active materials disclosed herein are polymer coated hollow core-shell structures that are suitable for use in positive electrodes. These structures effectively confine sulfur within the hollow core, immobilize polysulfides that form within the hollow core, and improve conductivity by maintaining a good connection between the confined sulfur and the porous carbon shell. The polymer shell coating includes nitrogen atom(s) that bond to carbon atom(s) of the porous carbon shell. This results in a nitrogen-confused (i.e., nitrogen doped) porous carbon shell with the polymer coated thereon. As will be described in more detail below, it is believed that the presence of the nitrogen-confused porous carbon shell contributes to the advantages noted above.

Figure 1A:
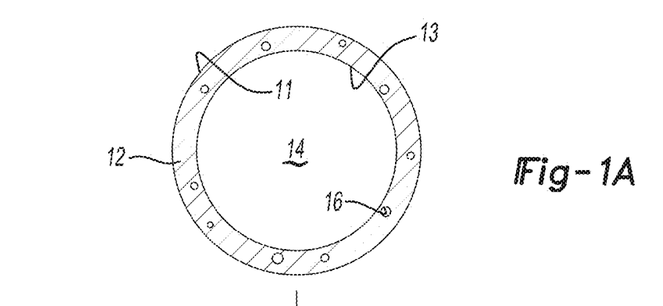
FIGS. 1A through 1C are schematic, cross-sectional views of an example of a method for making the sulfur based active material disclosed herein.
Figure 1B:
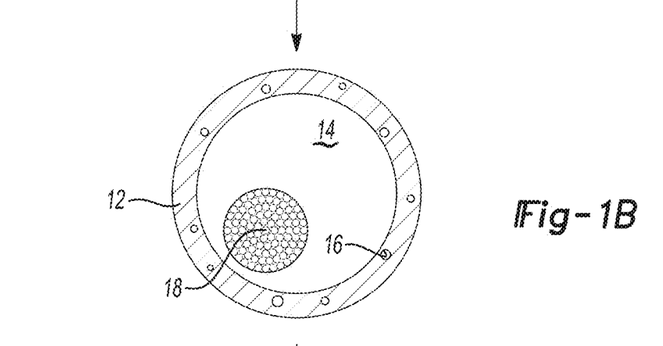
Figure 1C:
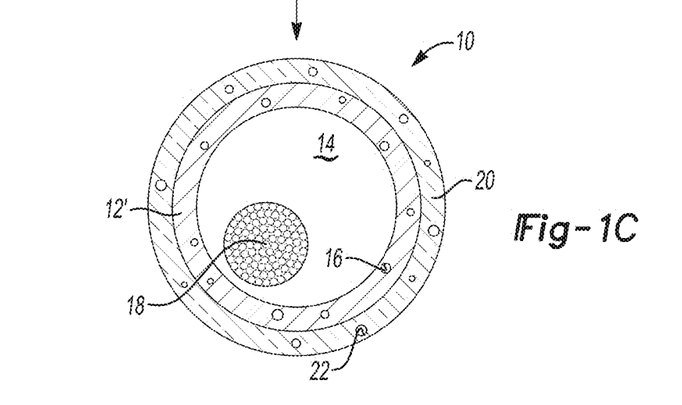

Referring now to FIGS. 1A through 1C, an example of a method for making an example of the sulfur based active material is depicted. At the outset of the method, as shown in FIG. 1A, a porous carbon shell 12 is formed. The porous carbon shell 12 surrounds a hollow core and includes a network of pores 16. Within the network of pores 16, any one pore may be interconnected with other pore(s) and/or may extend from an outer surface 11 of the carbon shell 12 to an inner surface 13 of the carbon shell 12. In an example, the porous carbon shell 12 is a mesoporous material with each of the pores 16 having a diameter ranging from about 1 nm to about 20 nm. A size (e.g., diameter) of the hollow core may be 1 µm or less.

The porous carbon shell 12 surrounding the hollow core 14 may be formed using a sacrificial porous template and a carbon precursor. The sacrificial porous template may be a mesoporous. As an example, the sacrificial porous template is a mesoporous silica template including a plurality of silica nanoparticles. The carbon precursor may be material that can be converted to carbon via pyrolysis. An example of the carbon precursor is dopamine, an amide, a urethane, an aniline, a pyrrole, or pyridine. It is to be understood that two or more of the listed materials may be used as the carbon precursor.

The carbon precursor may be deposited onto the surface(s) of and into the pores of the sacrificial porous template. In an example, the sacrificial porous template is suspended in a buffer solution and the carbon precursor is added thereto. The suspension may be stirred, centrifuged, and dried prior to initiating pyrolysis. Stirring, centrifuging, and drying forms a carbon precursor coated sacrificial porous template (e.g., polydopamine-coated silica particles).

Pyrolysis may be initiated by exposing the carbon precursor coated sacrificial porous template to elevated temperatures in the absence of oxygen. Examples of the elevated temperature may range from about 600° C. to about 1000° C. It is to be understood, however, that the temperature will depend, at least in part, on the precursor that is used. In an example, pyrolysis may take place at about 800° C. for about 4 hours under argon (or some other inert gas) flow. The time for pyrolysis may range from about 2 hours to about 10 hours. During this process, the carbon precursor is carbonized.

After carbonization is complete, the porous carbon shell 12 is formed on the surface(s) of and in the pores of the sacrificial porous template. The sacrificial porous template may then be removed to open up the pores 16 of the porous carbon shell 12, and to form the hollow core 14 at the interior of the porous carbon shell 12. In an example, the sacrificial porous template is removed by a selective etching process which dissolves the sacrificial porous template and does not affect the porous carbon shell 12. The etchant selected will depend, at least in part, upon the materials used for the sacrificial porous template and the porous carbon shell 12. In some examples, the etchant is an acid, and in other examples, the etchant is a base. In an example, the etchant is a 5% solution of hydrofluoric acid. In another example, the etchant is base solution including NaOH and KOH. The porous carbon shell 12 may be dried (e.g., via vacuum drying) after the sacrificial porous template is removed.

As shown in FIG. 1B, sulfur 18 is then impregnated into a portion of the hollow core 14. This may be accomplished by mixing the porous carbon shell 12 with sulfur powder, and subjecting the mixture to a heat treatment. In an example, the weight ratio of the porous carbon shell 12 to the sulfur powder is about 1:4. The heat treatment may be performed under vacuum or in the atmosphere. An example temperature for the heat treatment may be about 160° C.

The heat treatment impregnates the sulfur 18 into a portion of the hollow core 14 of the porous carbon shell 12, and thus forms a hollow carbon-sulfur composite 17. In an example, the sulfur 18 is in the form of a plurality of nanoparticles, each of which has a size (e.g., diameter) of less than 500 nm.

The hollow carbon-sulfur composite 17 may be referred to as a yolk-shell structure, at least in part because the sulfur 18 is like a yolk within the porous carbon shell 12. More particularly, the sulfur 18 does not fill the entire volume of the hollow core 14. As such, a void (e.g., unoccupied space) remains at/near the center of the hollow carbon-sulfur composite 17. In an example, a maximum amount of the sulfur 18 that is present in the hollow core 14 after impregnation occupies less than 90% of the hollow core volume. In another example, the sulfur 18 occupies about 85% of the hollow core volume. In still another example, the sulfur 18 occupies about 75% of the hollow core volume. The portion of the hollow core 14 that remains as the void provides space to accommodate the volumetric expansion and contraction of the sulfur 18 during lithiation.

The amount of sulfur 18 impregnated into the hollow core 14 may be controlled by the amount of sulfur used and/or by the amount of time for the heat treatment. As an example, the weight ratio of the porous carbon shell 12 to the sulfur powder is less than 1:10 to obtain an amount of impregnated sulfur that can accommodate the volume expansion. In an example, the heating time is about 10 hours. If the heating time is 10 hours or less, the longer the heat treatment, the more sulfur that will become impregnated. It is to be understood that heating longer than 10 hours generally has no effect on the impregnation process.

The hollow carbon-sulfur composite 17 may then be dispersed into an aqueous solution including a nitrogen-containing monomer and having an alkaline (basic) pH. Examples of the nitrogen-containing monomer include dopamine, acrylamide, pyrrole, acrylonitrile, pyridine, urethane, and aniline. An example of the aqueous solution is a Tris buffer solution with a pH of about 10. In an example solution, the molar weight of the monomer is less than 5% of the molar weight of the sulfur 18.

The dispersion may be stirred at a reaction temperature for a time sufficient to polymerize the nitrogen-containing monomer. The reaction temperature will depend, at least in part, on the nitrogen-containing monomer that is used. In an example, the reaction temperature ranges from about 0° C. to about 60° C. Stirring may be accomplished for any time up to about 20 hours. In an example, the time that is sufficient to complete polymerization ranges from about 3 hours to about 20 hours.

In some examples, the nitrogen-containing monomer may self-polymerize at the alkaline pH of the aqueous solution, and may spontaneously deposit on and bond to the surface of the hollow carbon-sulfur composite 17 to form the polymer shell coating 20, the nitrogen-confused porous carbon shell 12', and the polymer coated hollow core-shell structures 10 (see FIG. 1C). In other examples, the nitrogen-containing monomer (e.g., pyrrole or aniline) is polymerized in the aqueous solution in the presence of an oxidant, such as $FeCl_3$ or ammonium persulfate, to form the polymer shell coating 20, the nitrogen-confused porous carbon shell 12', and the polymer coated hollow core-shell structures 10.

Depending upon the nitrogen-containing monomer that is used, the polymer shell coating 20 may be made of polydopamine, polypyrrole, polyaniline, polyamides, polyacrylonitrile, polyurethane, polypyridine, or combinations thereof. It is to be understood that any example of the polymer shell coating 20 disclosed herein includes at least some nitrogen atoms that bond to at least some of the carbon atoms in the porous carbon shell 12 to form the nitrogen-confused porous carbon shell 12'.

The polymer shell coating 20 also includes pores 22. In general, the pores 22 form as a result of the aggregation of cross-linked polymer chains in the coating 20. These pores 22 may be sized i) to allow lithium ions to pass through, and ii) to block polysulfide ions from passing through. The polymer shell coating 20 effectively acts as a barrier to polysulfide ions that may form in the hollow core 14 as a result of the sulfur 18 being reduced in sequence (e.g., $S_8$, $Li_2S_8$, $Li_2S_6$, $Li_2S_4$, $Li_2S_2$, and $Li_2S$) during lithium-sulfur battery discharge. As such, the polysulfides may be effectively prevented from dissolving into the electrolyte during the lithium-sulfur battery cycling.

Additionally, during lithium-sulfur battery cycling, the polymer shell coating 20 will react with the free lithium polysulfides and form a three-dimensional, cross-linked polymer shell through inter-chain disulfide bond interconnection. This will introduce some free sulfide anions among the polymer chains (e.g., in/on the shell) to allow the penetration of lithium ions. This not only further confines the sulfur 18 and the polysulfide(s), but also improves the ionic conductivity. The cross-linking may also increase the mechanical strength of the polymer shell coating 20 for better tethering of the polysulfide species inside the polymer shell coating 20.

It is to be understood that the sulfur 18 in the hollow core 14 of the polymer coated hollow core-shell structure 10 remains crystalline, and no new phase is generated during the heat treatment and polymerization.

Figure 2:
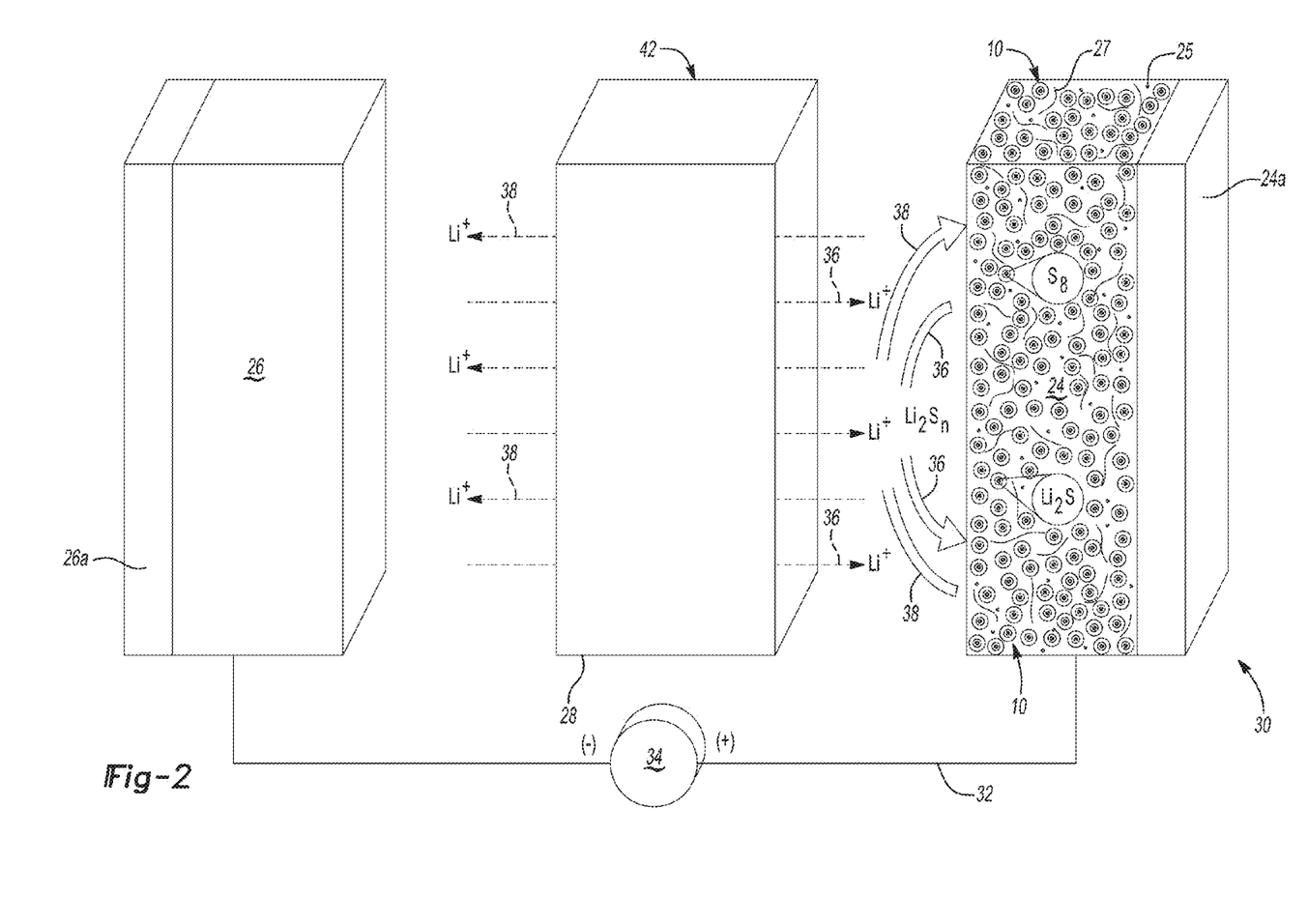
FIG. 2 is a schematic, perspective view of a lithium-sulfur battery showing a charging and discharging state, the battery including an example of the porous separator according to the present disclosure.

The polymer coated hollow core-shell structure 10 may be used as the sulfur based active material in a positive electrode of a lithium-sulfur battery. An example of the lithium-sulfur battery 30 including this positive electrode 24 is shown in FIG. 2, which will now be discussed in detail. The lithium-sulfur battery 30 generally includes the positive electrode 24, a negative electrode 26, and a porous polymer separator 28 positioned between the positive and negative electrodes 24, 26.

The positive electrode 24 may include up to 90% by weight (i.e., 90 wt %) of the polymer coated hollow core-shell structures 10 (i.e., sulfur based active material). In addition to including the polymer coated hollow core-shell structures 10, the positive electrode 24 also includes a conductive carbon material 25 and a binder 27. An example of the conductive carbon material 25 is a high surface area carbon, such as acetylene black. The binder 27 may be any polymer binder material that can structurally hold the polymer coated hollow core-shell structures 10 together. As examples, the polymeric binder may be made of at least one of polyvinylidene fluoride (PVdF), polyethylene oxide (PEO), an ethylene propylene diene monomer (EPDM) rubber, or carboxymethyl cellulose (CMC)). In an example, the positive electrode 24 includes about 85 wt % of the polymer coated hollow core-shell structures 10, about 10 wt % of the conductive carbon material 25, and about 5 wt % of the binder 27.

The negative electrode 26 may include any lithium host material that can sufficiently undergo lithium plating and stripping while functioning as the negative terminal of the lithium-sulfur battery 30. Graphite is widely utilized as the lithium host material because it exhibits reversible lithium intercalation and deintercalation characteristics, is relatively non-reactive, and can store lithium in quantities that produce a relatively high energy density. Commercial forms of graphite that may be used to fabricate the negative electrode 26 are available from, for example, Timcal Graphite & Carbon (Bodio, Switzerland), Lonza Group (Basel, Switzerland), or Superior Graphite (Chicago, Ill.). Other materials can also be used to form the lithium host material of the negative electrode 26, such as, for example, lithium titanate or lithiated silicon (e.g., $LiSi_x$).

The negative electrode 26 may also include a polymer binder material to structurally hold the lithium host material together. For example, the negative electrode 26 may be formed of an active material, made from graphite or a low surface area amorphous carbon, intermingled with a binder, made from polyvinylidene fluoride (PVdF), an ethylene propylene diene monomer (EPDM) rubber, sodium alginate, or carboxymethyl cellulose (CMC). These materials may be mixed with a high surface area carbon, such as acetylene black, to ensure electron conduction between the active material particles of the negative electrode 26 and, for example, a current collector 26a.

As shown in FIG. 2, the lithium-sulfur battery 30 may also include a positive-side current collector 24a and the previously mentioned negative-side current collector 26a positioned in contact with the positive electrode 24 and the negative electrode 26, respectively, to collect and move free electrons to and from an external circuit 32. The positive-side current collector 24a may be formed from aluminum or any other appropriate electrically conductive material known to skilled artisans. The negative-side current collector 26a may be formed from copper or any other appropriate electrically conductive material known to skilled artisans.

The lithium-sulfur battery 30 also includes the porous polymer separator 28, which operates as both an electrical insulator and a mechanical support. The porous polymer separator 28 is sandwiched between the positive electrode 24 and the negative electrode 26 to prevent physical contact between the two electrodes 24, 26 and the occurrence of a short circuit. The porous polymer separator 28, in addition to providing a physical barrier between the two electrodes 24, 26, ensures passage of lithium ions (identified by the $Li^+$) and some related anions through an electrolyte solution filling its pores (not shown).

The porous polymer separator 28 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer membranes include single layer polypropylene membranes, such as CELGARD 2400 and CELGARD 2500 from Celgard, LLC (Charlotte, N.C.). It is to be understood that the porous polymer separator 28 may be coated or treated, or uncoated or untreated. For example, the porous polymer separator 28 may or may not include any surfactant treatment thereon.

In other examples, the porous polymer separator 28 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the separator 28 is poly(p-hydroxybenzoic acid). In yet another example, the porous polymer separator 28 may be chosen from a combination of the polyolefin (such as PE and/or PP) and one or more of the polymers listed above.

The porous polymer separator 28 may be a single layer or may be a multi-layer (e.g., bilayer, trilayer, etc.) laminate fabricated from either a dry or wet process. In some instances, the porous polymer separator 28 may include fibrous layer(s) to impart appropriate structural and porosity characteristics.

Each of the positive electrode 24, a negative electrode 26, and a porous polymer separator 28 are soaked in an electrolyte solution. Any appropriate electrolyte solution that can conduct lithium ions between the negative electrode 26 and the positive electrode 24 may be used in the lithium-sulfur battery 30. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in the ether to form the non-aqueous liquid electrolyte solution include $LiClO_4$, $LiAlCl_4$, $LiI$, $LiBr$, $LiSCN$, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The lithium-sulfur battery 30 also includes an interruptible external circuit 32 that connects the positive electrode 24 and the negative electrode 26. The lithium-sulfur battery 30 may also support a load device 34 that can be operatively connected to the external circuit 32. The load device 34 may be powered fully or partially by the electric current passing through the external circuit 43 when the lithium-sulfur battery 30 is discharging. While the load device 34 may be any number of known electrically-powered devices, a few specific examples of a power-consuming load device include an electric motor for a hybrid vehicle or an all-electrical vehicle, a laptop computer, a cellular phone, and a cordless power tool. The load device 34 may also, however, be a power-generating apparatus that charges the lithium-sulfur battery 30 for purposes of storing energy. For instance, the tendency of windmills and solar panels to variably and/or intermittently generate electricity often results in a need to store surplus energy for later use.

The lithium-sulfur battery 30 can include a wide range of other components that, while not depicted here, are nonetheless known to skilled artisans. For instance, the lithium-sulfur battery 30 may include a casing, gaskets, terminals, tabs, and any other desirable components or materials that may be situated between or around the positive electrode 24 and the negative electrode 26 for performance-related or other practical purposes. Moreover, the size and shape of the lithium-sulfur battery 30, as well as the design and chemical make-up of its main components, may vary depending on the particular application for which it is designed. Battery-powered automobiles and hand-held consumer electronic devices, for example, are two instances where the lithium-sulfur battery 30 would most likely be designed to different size, capacity, and power-output specifications. The lithium-sulfur battery 30 may also be connected in series and/or in parallel with other similar lithium-sulfur batteries 30 to produce a greater voltage output and current (if arranged in parallel) or voltage (if arranged in series) if the load device 34 so requires.

The lithium-sulfur battery 30 can generate a useful electric current during battery discharge (shown by reference numeral 36 in FIG. 2). During discharge, the chemical processes in the battery 30 include lithium ($Li^+$) dissolution from the surface of the negative electrode 26 and incorporation of the lithium cations into alkali metal polysulfide salts (i.e., $Li_2S$) within the respective cores 14 of the polymer coated hollow core-shell structures 10. As such, polysulfides are formed (sulfur is reduced) within the polymer coated hollow core-shell structures 10 in the positive electrode 24 in sequence while the battery 30 is discharging. The chemical potential difference between the positive electrode 24 and the negative electrode 26 (ranging from approximately 1.5 to 3.0 volts, depending on the exact chemical make-up of the electrodes 24, 26) drives electrons produced by the dissolution of lithium at the negative electrode 26 through the external circuit 32 towards the positive electrode 24. The resulting electric current passing through the external circuit 32 can be harnessed and directed through the load device 34 until the lithium in the negative electrode 26 is depleted and the capacity of the lithium-sulfur battery 30 is diminished.

The lithium-sulfur battery 30 can be charged or re-powered at any time by applying an external power source to the lithium-sulfur battery 30 to reverse the electrochemical reactions that occur during battery discharge. During charging (shown at reference numeral 38 in FIG. 2), lithium plating to the negative electrode 26 takes place and sulfur formation within the respective cores 14 of the polymer coated hollow core-shell structures 10 at the positive electrode 24 takes place. The connection of an external power source to the lithium-sulfur battery 30 compels the otherwise non-spontaneous oxidation of lithium at the positive electrode 24 to produce electrons and lithium ions. The electrons, which flow back towards the negative electrode 26 through the external circuit 32, and the lithium ions (Li+), which are carried by the electrolyte across the porous polymer separator 28 back towards the negative electrode 26, reunite at the negative electrode 26 and replenish it with lithium for consumption during the next battery discharge cycle. The external power source that may be used to charge the lithium-sulfur battery 30 may vary depending on the size, construction, and particular end-use of the lithium-sulfur battery 30. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosed example(s).

EXAMPLE

A sulfur based active material according to the examples is disclosed herein. This sulfur based active material included polydopamine coated hollow core-shell structures.

To make the porous carbon shell of the example sulfur based active material, a mesoporous silica template was suspended in a Tris buffer solution, and dopamine was added to the solution to form a suspension. The suspension was stirred for about 20 hours, centrifuged, and dried, resulting in polydopamine-coated silica particles. This product was then carbonized at 800° C. for about 4 hours under argon flow to carbonize the polydopamine (i.e., form the carbon shells). The silica template was removed from the carbon shells by etching with hydrofluoric acid (5%). This exposed the pores and the hollow core. The porous carbon shells were vacuum dried.

The hollow porous carbon shells were mixed with sulfur powder and heat treated to introduce sulfur into the hollow core. The weight ratio of the sulfur to carbon was about 4:1, and the mixture was heated at about 160° C. for about 10 hours. This product is referred to in this Example as "HC-S composite".

To prepare the polydopamine coating and the nitrogen-confused porous carbon shell, the HC-S composite was dispersed in a Tris buffer solution, and dopamine was added. This dispersion was stirred for 20 hours at room temperature to yield the polydopamine coated hollow core-shell structures (referred to as "PDA-HC-S composite").

Some of the HC-S composite was left uncoated. This was used as a comparative sulfur based active material.

Figure 3A:
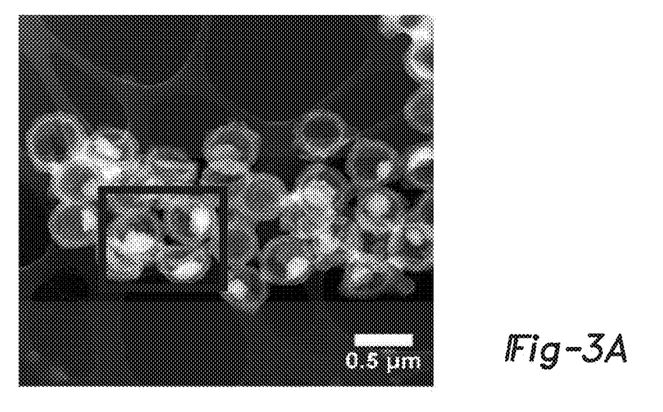
FIG. 3A is a Scanning Transition Electron Micrograph (STEM) of an example of the sulfur based active material disclosed herein.

Scanning Transmission Electron Microscopy (STEM) images were taken of the PDA-HC-S composite (i.e., the example sulfur based active material) and of the HC-S composite (i.e., the comparative sulfur based active material). These are shown in FIGS. 3A and 4A, respectively.

Figure 4A:
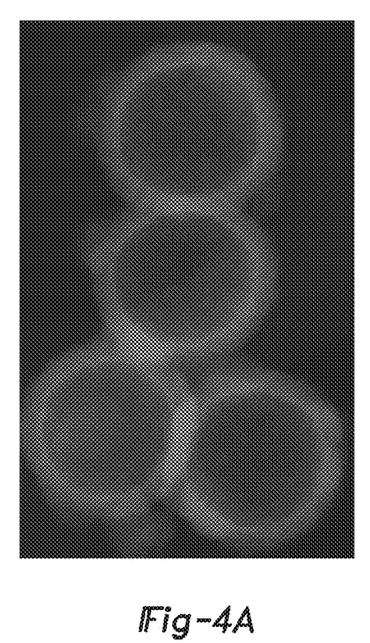
FIG. 4A is a STEM of a comparative hollow carbon-sulfur composite without a polymer shell coating.
Figure 4B:
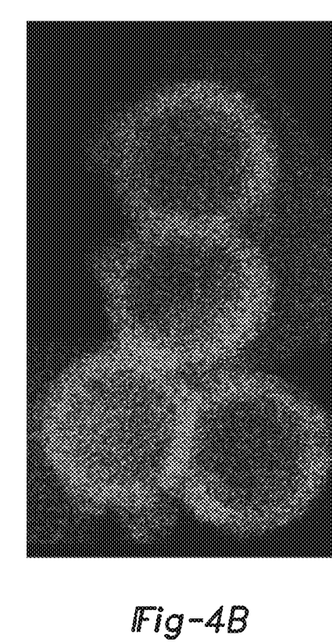
FIG. 4B illustrates the elemental mapping of carbon in the region of the comparative hollow carbon-sulfur composite shown in the rectangle of FIG. 4A.
Figure 4C:
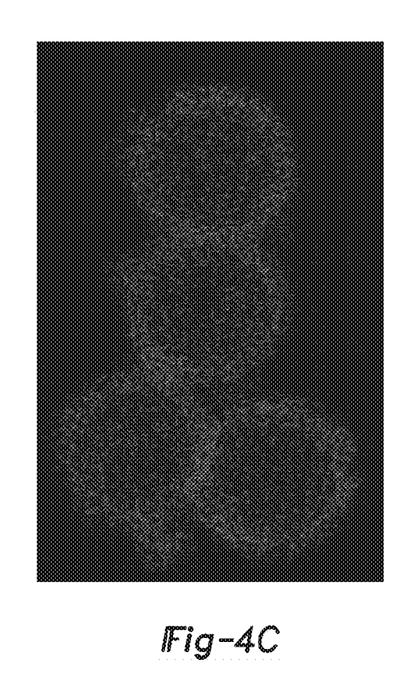
FIG. 4C illustrates the elemental mapping of sulfur in the region of the comparative hollow carbon-sulfur composite shown in the rectangle of FIG. 4A.

As shown in FIG. 4A (the STEM image of the comparative HC-S composite), each of the hollow carbons were almost empty (i.e., there is a lack of a bright species in/near the center of the hollow carbons, which is indicative of sulfur). Elemental maps of carbon (FIG. 4B) and sulfur (FIG. 4C) confirmed that sulfur particles were present in the comparative HC-S composites, but were not concentrated within the center of the hollow core. This data suggests that most of the sulfur in the HC-S composite was sublimated out in the high vacuum of STEM, due to the porous nature of the hollow carbon shells and high vapor pressure of sulfur.

Figure 3B:
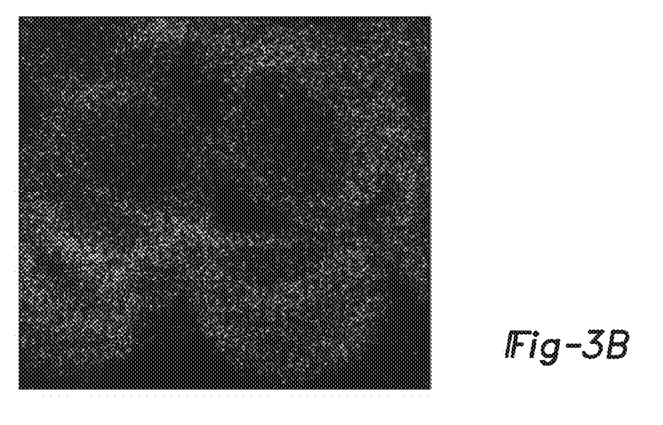
FIG. 3B illustrates the elemental mapping of carbon in the region of the sulfur based active material shown in the rectangle of FIG. 3A.
Figure 3C:
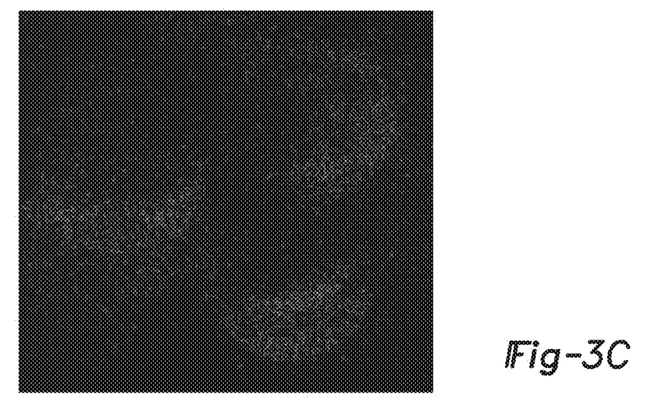
FIG. 3C illustrates the elemental mapping of sulfur in the region of the sulfur based active material shown in the rectangle of FIG. 3A.

In contrast, in the STEM image of the PDA-HC-S composite (FIG. 3A), sulfur particles could be clearly observed (i.e., the bright species is visible). The elemental mapping of carbon (FIG. 3B) and sulfur (FIG. 3C) for the PDA-HC-S composite provided visible evidence that the sulfur was coated by carbon shell. The elemental maps visually verified that the polydopamine coating effectively confined the sulfur inside the PDA-HC-S composite even under the high vacuum of STEM. This indicates that the presence of the polymer shell successfully immobilized the elemental sulfur under tough conditions. Therefore, it is believed that the polymer shell can also aid in trapping the sulfur/polysulfides during the discharge/charge process.

The comparative HC-S composite and example PDA-HC-S composite were used to make comparative cathodes and example cathodes, respectively. To prepare the example cathodes, the PDA-HC-S composite was first mixed with carbon black and water soluble binder PVA (85:10:5 by weight) through ground in a mortar. To prepare the comparative cathodes, the HC-S composite was first mixed with carbon black and water soluble binder PVA (85:10:5 by weight) through ground in a mortar. The respective mixtures were then roll-pressed to produce example cathode films and comparative cathode films, each with an average sulfur loading of 1.2 mg cm$^{-2}$, which were heated at 500° C. for about 1 hour under vacuum.

The example cathode films and comparative cathode films were used as cathodes in 2032 type coin cells. The coin cells were fabricated in an argon filled glove box using lithium foil as the anode. The electrolyte was 1M lithium bis-trifluoromethanesulfonylimide (LiTFSI) containing 1 wt. % LiNO$_3$ in a mixed solvent of 1,3-dioxolane/1,2-dimethoxy-ethane (DOL:DME, 1:1, v/v). The final sulfur contents in the HC-S composite containing comparative cathode films and the PDA-HC-S composite containing cathode films were calculated to be 64% and 55%, respectively. The coin cells including the PDA-HC-S composite containing cathode films are referred to as the example cells and the coin cells including the HC-S composite containing comparative cathode films are referred to as the comparative example cells.

Figure 5A:
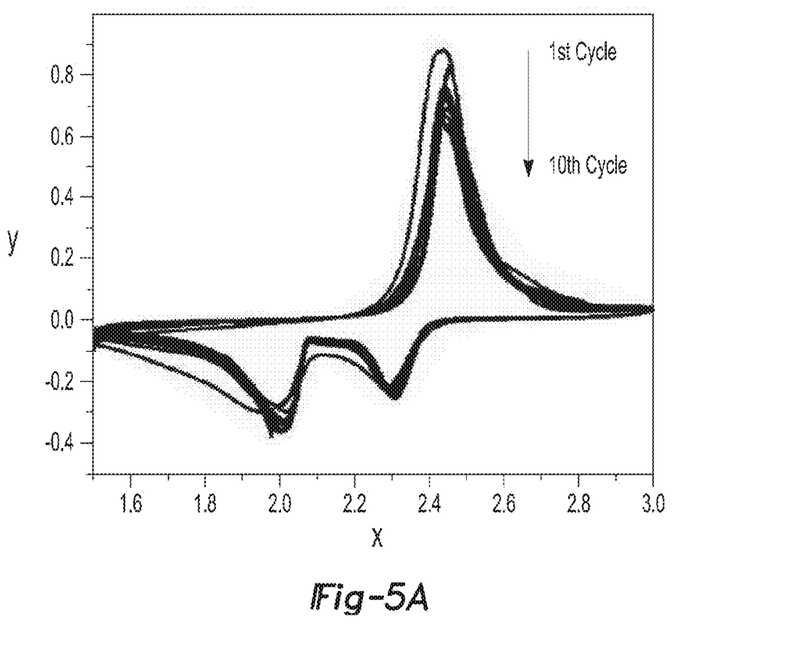
FIGS. 5A and 5B are cyclic voltammetry (CV) curves of lithium-sulfur cells with an example of the sulfur based active material (FIG. 5A) and with a comparative hollow carbon-sulfur composite (FIG. 5B) as cathode materials, respectively.
Figure 5B:
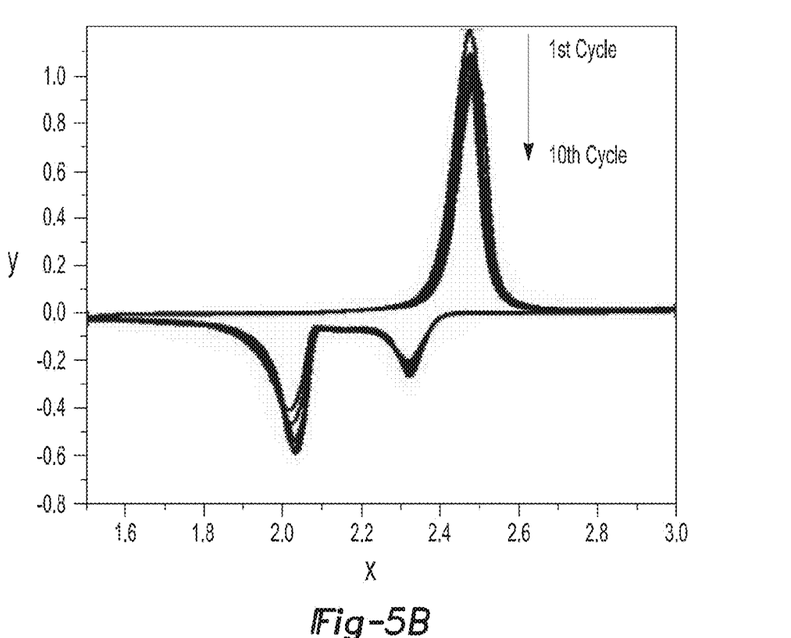

Cyclic voltammetry (CV) curves of the example cell and the comparative example cell were obtained at a scan rate of 0.02 mV s$^{-1}$. These results are shown in FIGS. 5A and 5B, respectively. The X-axis is voltage (V, vs. Li/Li$^+$) and the Y-axis is current (mA).

Two well-defined reduction peaks at 2.3 and 2.08V were observed, which could be assigned to the multistep reduction mechanism of elemental sulfur. The reduction peak centered at 2.3V is generally attributed to the reduction of the S$_8$ ring and the formation of S$_8^{2-}$. The reduction peak at 2.08V is associated with further reduction of the higher polysulfide species (Li$_2$S$_n$, 4<n<8) to the lower polysulfide species (Li$_2$S$_n$, n≤2). The broad oxidation peak around 2.3-2.5V is associated with the oxidation of polysulfides to the neutral elemental S$_8$. Compared with the sharp peaks in the CV curves of the comparative example cell (FIG. 5B), the reduction peak of the example cell (including the PDA-HC-S cathode) gave slightly broader peaks at both discharge and charge couples. This could be attributed to the reduction of disulfide bonds connected among the polydopamine chains through in-situ chemical addition and slight increase of the impedance due to the polymer coating. Previous studies have confirmed that polydopamine chains could react with thiol/sulfide groups by chemical addition. In this way, the polydopamine chains would form a cross-linked structure together with some free sulfide anions at the terminal in/on the shell of PDA-HC-S composite, which will help to further confine the sulfur inside of the core and facilitate the ionic transportation of Li$^+$.

Figure 5C:
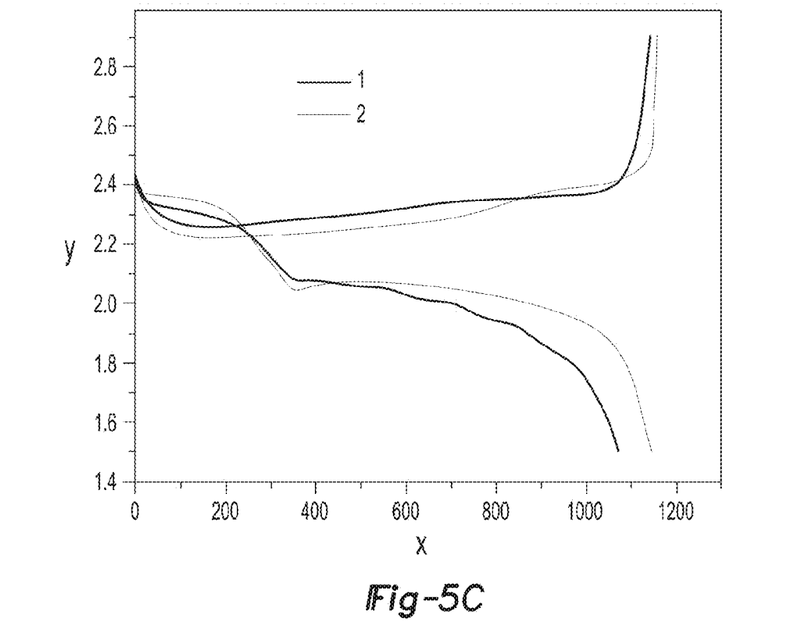
FIG. 5C is a graph depicting the charge and discharge profiles (V vs. mAh/g) for the lithium-sulfur cells with an example of the sulfur based active material and with a comparative hollow carbon-sulfur composite as cathode materials.

FIG. 5C depicts the initial discharge/charge profiles of the comparative cathode film (CE) and the example cathode film (E) at 0.2 C in the comparative example cell and the example cell, respectively. In FIG. 5C, the X-axis is capacity (mAhg$^{-1}$) and the Y-axis is voltage (V, vs. Li/Li').

For the comparative cathode film (2), two flat discharge plateaus located at 2.35V and 2.08V could be clearly observed. Two less well defined discharge plateaus centered at 2.3V and 2.05V were observed for example cathode film (1). These results are in agreement with the CV curves of FIGS. 5A and 5B. At 0.2 C, the comparative cathode film (2) and example cathode film (1) delivered the initial discharge capacities of 1141 and 1070 mAh g$^{-1}$, respectively.

Figure 5D:
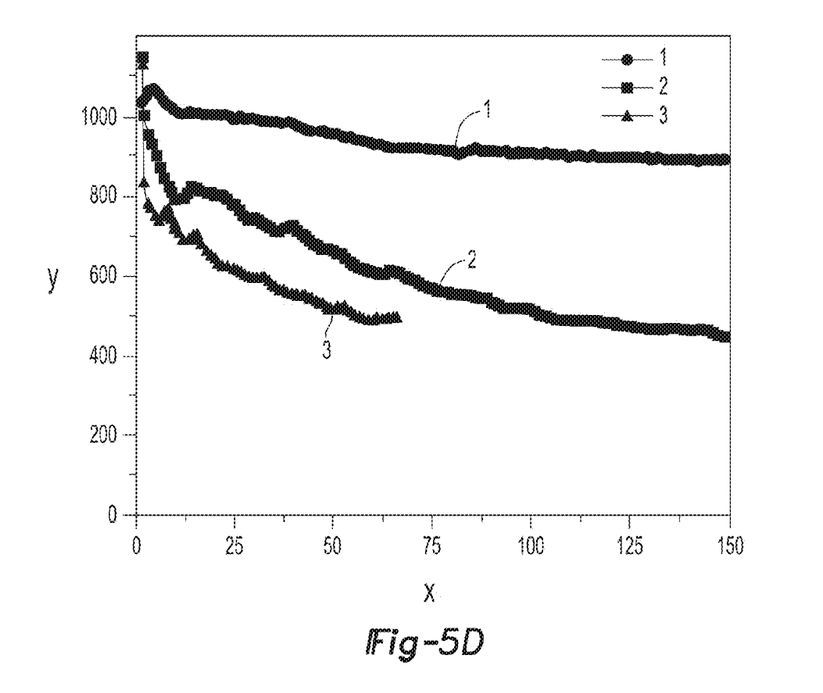
FIG. 5D is a graph illustrating the discharge capacity (mAh/g) vs. cycle number for the lithium-sulfur cells with an example of the sulfur based active material, with a comparative hollow carbon-sulfur composite, and with pure sulfur as cathode materials.

FIG. 5D shows the cycling performances of the example cell, the comparative example cell, and another comparative example cell at 0.2 C. The other comparative example cell was made as described above, except it included a comparative example cathode film (3) of pure sulfur and carbon black. In FIG. 5D, the X-axis is the number of cycles and the Y-axis is capacity (mAhg$^{-1}$).

For the example cell including the example cathode film (1), after ten cycles of activation, the capacity tended to stabilize at around 950 mAh g$^{-1}$. After 150 cycles, a capacity of 900 mAh g$^{-1}$ was still retained, which corresponds to a capacity retention of 84%. In contrast, the comparative example cell (including comparative example cathode film (2)) exhibited poorer cycling stability. The comparative example cathode film (2) showed an initial discharge capacity of 1141 mAh g$^{-1}$ followed by a gradual decrease during the subsequent cycles. Compared with the cycling performance of the comparative example cathode film (3), capacity fading of the comparative example cathode film (2) was still lower. The relatively slow capacity fading of comparative example cathode film (2) does indicate that the structure of HC-S composite can alleviate, at least in part, the dissolution of the lithium polysulfides into the electrolyte.

Figure 5E:
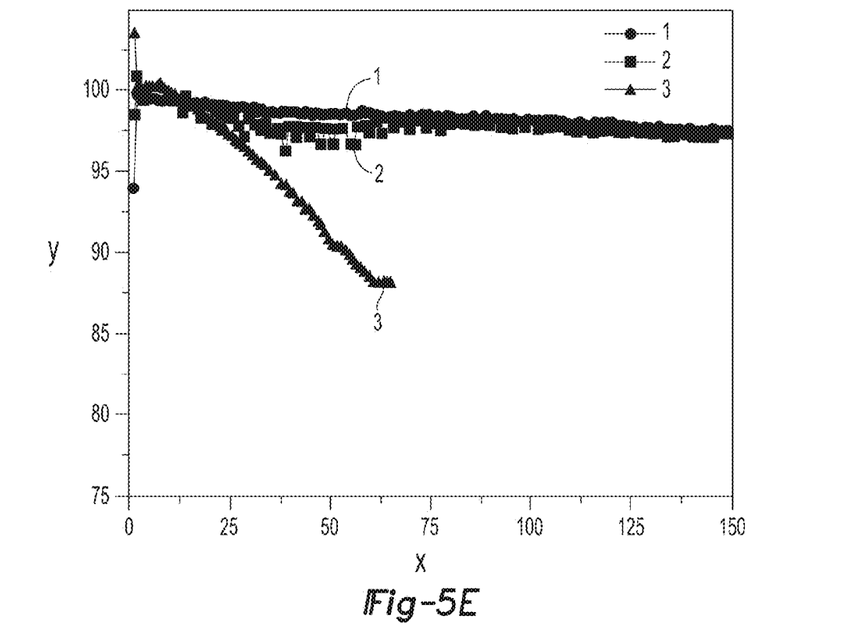
FIG. 5E is a graph illustrating the Coulombic efficiency (%) vs. cycle number for the lithium-sulfur cells with an example of the sulfur based active material, with a comparative hollow carbon-sulfur composite, and with pure sulfur as cathode materials.

FIG. 5E compares the Coulombic efficiency of example cathode film (1), comparative example cathode film (2), and comparative example cathode film (3). In FIG. 5E, the X-axis is the number of cycles and the Y-axis is Coulombic efficiency (%).

As shown in FIG. 5E, the efficiency of example cathode film (1) was higher than that of comparative example cathode film (2), especially at initial 60 cycles. Both the relatively poor cyclability and low efficiency associated with the heavier polysulfide dissolution and shuttling effect of the polysulfide species suggests that the comparative example cathode film (2) could not effectively immobilize the polysulfide during long cycling. These different electrochemical behaviors of comparative example cathode film (2) and example cathode film (1) in the coin cells were in good agreement with what they exhibited in the STEM images (FIGS. 4A and 3A, respectively), where the sulfur of comparative example cathode film (2) was easily sublimated off under the high vacuum but the sulfur in example cathode film (1) was well confined.

Figure 6:
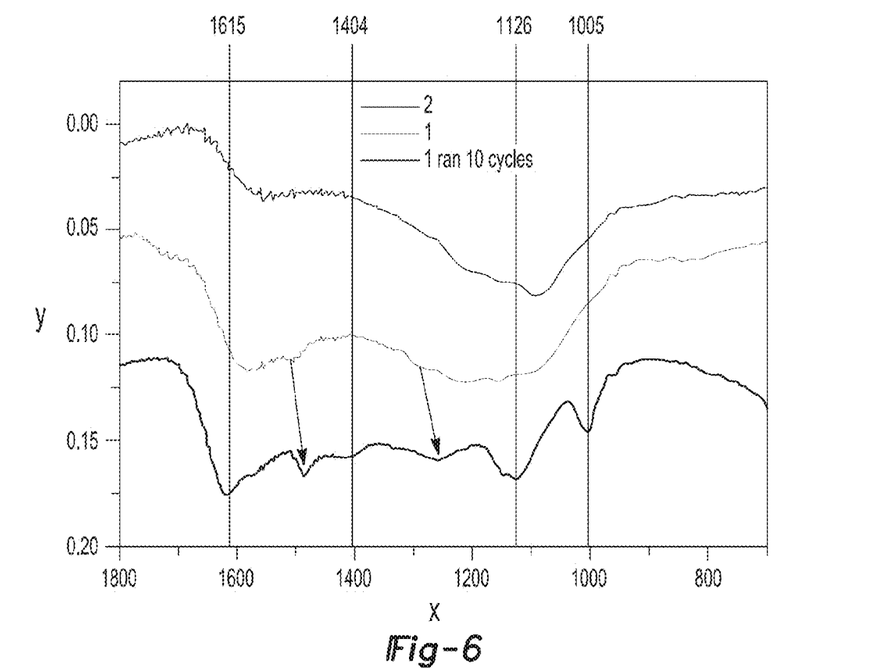
FIG. 6 is graph depicting the Fourier Transform Infrared Spectroscopy (FTIR) spectra of the sulfur based active material cathode material before and after 10 cycles in a lithium-sulfur cell and of the comparative hollow carbon-sulfur composite cathode material.

To further investigate the mechanism of the polydopamine coating during the discharge/charge process, the example coin cells with example cathode film (1) were disassembled after running 10 cycles and the obtained cathode films were rinsed with ethanol to wash out the electrolyte. Fourier transform infrared spectroscopy (FTIR) spectra was performed on the example cathode film (1) (before and after running 10 cycles in cells) and on comparative example cathode film (2). The FTIR results are shown in FIG. 6, which the X-axis being the wavelength (cm$^{-1}$) and the Y-axis being transmittance (a.u.).

The FTIR for the example cathode film (1) after running 10 cycles in cells exhibited obvious peaks at 1615 cm$^{-1}$ and 1404 cm$^{-1}$, suggesting the formation of S—Li or O—Li. Both the C═C stretching vibration at 1498 cm$^{-1}$ from the benzenoid rings and the C—N stretching vibrational bands at 1307 cm$^{-1}$ shifted to lower wave numbers, due to the addition of S atoms on benzenoid rings. Two peaks at 1126 and 1005 cm$^{-1}$ arose in the cycled example cathode film (1), which could be ascribed to the C—S stretching vibration.

The data set forth in this example suggest that the example cathode film (1) formed a sulfide/polysulfide anions cross-linked polydopamine shell, which would allow the transportation of lithium cations and confine the polysulfide always in the cathode section during the charge/discharge reactions.

The significantly improved cyclability in the examples cells with the example cathode film (1) may be attributed to the confinement of the polydopamine coating and the porous property of the nitrogen-confused carbon shell.

It is to be understood that the ranges provided herein include the stated range and any value or sub-range within the stated range. For example, a range of about 600° C. to about 1000° C. should be interpreted to include not only the explicitly recited limits of about 600° C. to about 1000° C., but also to include individual values, such as 625° C., 775° C., 930.5° C., etc., and sub-ranges, such as from about 650° C. to about 950° C.; from about 800° C. to about 995° C., etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A sulfur based active material, comprising:
 a core-shell structure, including:
  a hollow core; and
  a porous carbon shell surrounding the hollow core;
 sulfur present in a portion of the hollow core; and
 a polymer shell coating formed on the porous carbon shell, the polymer shell coating including nitrogen atoms that bond to carbon atoms of the porous carbon shell so that the porous carbon shell is a nitrogen-confused porous carbon shell.

2. The sulfur based active material as defined in claim 1 wherein the polymer shell coating is made of polydopamine, polypyrrole, polyaniline, polyamides, polyacrylonitrile, polyurethane, or combinations thereof.

3. The sulfur based active material as defined in claim 1, wherein the sulfur is in the form of a plurality of nanoparticles, each of which has a size of less than 500 nm.

4. The sulfur based active material as defined in claim 1, wherein:
 a size of the hollow core is less than 1μm;
 a maximum amount of the sulfur present in the hollow core occupies less than 90% of the hollow core; and
 an other portion of the hollow core is a void.

5. The sulfur based active material as defined in claim 1, further comprising a polysulfide ion cross-linked to the polymer shell coating.

6. The sulfur based active material as defined in claim 1, wherein the polymer shell coating includes pores having a size to transport lithium ions and to block transport of polysulfide ions.

7. A positive electrode, comprising:
a sulfur based active material, including:
a core-shell structure with a hollow core and a porous carbon shell surrounding the hollow core;
sulfur present in a portion of the hollow core; and
a polymer shell coating formed on the porous carbon shell, the polymer shell coating including nitrogen atoms that bond to carbon atoms of the porous carbon shell so that the porous carbon shell is a nitrogen-confused porous carbon shell;
a conductive carbon material; and
a binder.

8. The positive electrode as defined in claim 7, wherein the polymer shell coating is made of polydopamine, polypyrrole, polyaniline, polyamides, polyacrylonitrile, polyurethane, or combinations thereof.

9. The positive electrode as defined in claim 7, wherein:
the conductive carbon material is acetylene black;
the binder is water soluble poly(vinyl alcohol); and
a total amount of the sulfur based active material in the positive electrode is up to 90% by weight.

10. The positive electrode as defined in claim 7, wherein the sulfur is in the form of a plurality of nanoparticles, each of which has a size of less than 500 nm.

11. The positive electrode as defined in claim 7, further comprising a polysulfide ion cross-linked to the polymer shell coating.

12. A method for making a sulfur based active material, the method comprising:
forming a porous carbon shell having a hollow core;
incorporating sulfur into the hollow core, thereby forming a hollow carbon-sulfur composite;
dispersing the hollow carbon-sulfur composite in an aqueous solution including a nitrogen-containing monomer and having an alkaline pH, thereby forming a dispersion; and
stirring the dispersion at a reaction temperature for a time sufficient to polymerize the nitrogen-containing monomer and to form a polymer shell coating on the porous carbon shell of the hollow carbon-sulfur composite, whereby at least some of the nitrogen atoms of the polymer shell coating bond to carbon atoms of the porous carbon shell to form a nitrogen-confused porous carbon shell.

13. The method as defined in claim 12, wherein forming the porous carbon shell and incorporating sulfur into the hollow core are accomplished by:
depositing a carbon precursor onto and into a sacrificial porous template;
pyrolyzing the deposited carbon precursor, thereby forming the porous carbon shell on the sacrificial porous template;
removing the sacrificial porous template, thereby forming the hollow core of the porous carbon shell;
mixing sulfur with the porous carbon shell having the hollow core to form a mixture; and
heat treating the mixture, thereby impregnating the sulfur into the hollow core.

14. The method as defined in claim 13, wherein:
the carbon precursor is a polydopamine carbon precursor;
the sacrificial porous template includes a plurality of porous silica nanoparticles; and
the nitrogen-containing monomer is selected from the group consisting of dopamine, acrylamide, pyrrole, acrylonitrile, pyridine, urethane, and aniline.

15. The method as defined in claim 14, wherein:
pyrolyzing takes place at a temperature ranging from about 600° C. to about 1000° C. for about 4 hours under an inert gas;
removing the sacrificial porous template is accomplished with an acid or a base; and
stirring is accomplished from about 3 hours to about 20 hours.

16. A lithium-sulfur battery, comprising:
a positive electrode, including:
a sulfur based active material, including:
a core-shell structure with a hollow core and a porous carbon shell surrounding the hollow core;
sulfur present in a portion of the hollow core; and
a polymer shell coating formed on the porous carbon shell, the polymer shell coating including nitrogen atoms that bond to carbon atoms of the porous carbon shell so that the porous carbon shell is a nitrogen-confused porous carbon shell;
a conductive carbon material; and
a binder;
a negative electrode;
a porous membrane positioned between the positive electrode and the negative electrode; and
an electrolyte in contact with at least the porous membrane.

17. The lithium-sulfur battery as defined in claim 16, wherein the sulfur is in the form of a plurality of nanoparticles, each of which has a size of less than 500 nm.

18. The lithium-sulfur battery as defined in claim 16, wherein an other portion of the hollow core is a void.

19. The lithium-sulfur battery as defined in claim 16, further comprising a polysulfide ion cross-linked to the polymer shell coating.

* * * * *